(12) United States Patent
Harris

(10) Patent No.: US 10,080,463 B2
(45) Date of Patent: Sep. 25, 2018

(54) FOOD PROCESSING APPARATUS

(71) Applicant: Columbia Insurance Company, Omaha, NE (US)

(72) Inventor: E. Mark Harris, McHenry, IL (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 6 days.

(21) Appl. No.: 15/266,419

(22) Filed: Sep. 15, 2016

(65) Prior Publication Data

US 2017/0112327 A1    Apr. 27, 2017

Related U.S. Application Data

(60) Provisional application No. 62/280,500, filed on Jan. 19, 2016, provisional application No. 62/232,137, filed on Sep. 24, 2015.

(51) Int. Cl.
*A47J 43/044* (2006.01)
*A47J 43/07* (2006.01)
*B26D 3/11* (2006.01)

(52) U.S. Cl.
CPC ......... *A47J 43/044* (2013.01); *A47J 43/0711* (2013.01); *B26D 3/11* (2013.01); *A47J 2043/04454* (2013.01)

(58) Field of Classification Search
CPC . B26D 3/10; B26D 3/11; B26D 3/283; B26D 2210/00; B26D 2210/02; A47J 43/044; A47J 43/0711
USPC .............................. 83/932; 99/538, 544, 545
See application file for complete search history.

(56) References Cited

U.S. PATENT DOCUMENTS

| 1,212,915 | A | * | 1/1917 | Daughtry | ................ | F25C 5/043 |
| | | | | | | 241/92 |
| 1,809,764 | A | * | 6/1931 | Trunz | ....................... | B26D 7/01 |
| | | | | | | 83/13 |
| 2,018,932 | A | * | 10/1935 | Thorne | ................. | A47J 19/022 |
| | | | | | | 100/130 |
| 2,715,927 | A | * | 8/1955 | Cupper | .................... | B26D 3/22 |
| | | | | | | 269/54.4 |
| 3,128,810 | A | * | 4/1964 | Whipp | .................... | A47J 25/00 |
| | | | | | | 99/545 |

(Continued)

FOREIGN PATENT DOCUMENTS

| EP | 1759819 | 11/2008 |
| WO | WO2004113033 | 12/2004 |

*Primary Examiner* — Jason Daniel Prone
*Assistant Examiner* — Richard Crosby, Jr.
(74) *Attorney, Agent, or Firm* — Thompson Coburn LLP

(57) ABSTRACT

A food processing tool is provided with a base forming an operative surface disposed above a work surface. A first blade is disposed adjacent and generally parallel to the operative surface. A main body has a sidewall forming a chamber with front and rear openings. A rotatable rod extends into the chamber, and an external handle rotates the rod. A pusher element is attached to the rod and includes a set of pins extending from its lower surface to engage a food item. A second blade may be mounted in a slot adjacent the work surface and have a plurality of cutting points extending upwardly from a central spine, generally perpendicular to the first blade. A cover is removably attachable to the operative surface to cover the blades. A top face of the cover has a pin receiving structure to assist in removing the pusher from the rod.

21 Claims, 8 Drawing Sheets

(56) References Cited

U.S. PATENT DOCUMENTS

| | | | | |
|---|---|---|---|---|
| 3,489,357 | A * | 1/1970 | Katsuhiko | F25C 5/12 241/95 |
| 3,696,847 | A * | 10/1972 | Erekson | A23N 4/14 99/545 |
| 3,952,621 | A * | 4/1976 | Chambos | B26D 1/03 83/408 |
| 4,560,111 | A * | 12/1985 | Cavalli | B26D 3/22 241/282.2 |
| 4,723,719 | A * | 2/1988 | Williams | A47J 43/044 241/282.2 |
| 4,738,195 | A * | 4/1988 | Berube | B26D 3/185 99/537 |
| 4,878,627 | A * | 11/1989 | Otto | A47J 43/0722 241/199.12 |
| 5,089,286 | A * | 2/1992 | Geissler | A47J 25/00 426/512 |
| 5,236,135 | A * | 8/1993 | Wilson | A61M 5/3278 220/373 |
| 5,363,756 | A | 11/1994 | Muro | |
| 5,577,675 | A * | 11/1996 | Ishikawa | B01F 7/00208 241/172 |
| D414,983 | S * | 10/1999 | Wong | D7/381 |
| 6,053,098 | A * | 4/2000 | Yamamoto | B26D 3/11 83/425.1 |
| 6,096,360 | A * | 8/2000 | Dieso | B26D 3/11 426/518 |
| 6,484,627 | B1 * | 11/2002 | Peter | B26B 29/063 99/419 |
| 6,505,545 | B2 * | 1/2003 | Kennedy | A47J 27/04 366/145 |
| 6,968,765 | B2 * | 11/2005 | King | B26D 1/03 83/403 |
| 7,032,491 | B2 * | 4/2006 | Fischer | B26D 3/11 83/733 |
| 7,721,637 | B2 * | 5/2010 | Bucks | B26D 1/0006 83/349 |
| 7,878,701 | B2 * | 2/2011 | Stephens | A47J 27/004 366/145 |
| 8,016,479 | B2 * | 9/2011 | Imai | B01F 3/1221 366/147 |
| 8,104,391 | B2 * | 1/2012 | McCracken | A21C 11/10 83/331 |
| 8,136,443 | B2 * | 3/2012 | Lee | A47J 9/002 83/859 |
| 8,596,192 | B2 * | 12/2013 | Hauser | B26D 3/283 99/537 |
| 8,635,948 | B2 * | 1/2014 | Herren | A47J 43/0711 241/169.2 |
| 8,752,464 | B2 * | 6/2014 | Vaughan | B26D 3/26 83/698.11 |
| 8,967,514 | B2 * | 3/2015 | Verheem | B26D 3/26 241/169 |
| 8,991,734 | B2 | 3/2015 | May et al. | |
| 9,333,659 | B2 * | 5/2016 | Schillheim | A47J 43/0705 |
| D782,244 | S * | 3/2017 | Harris | D7/376 |
| D784,070 | S * | 4/2017 | Harris | D7/376 |
| 2003/0106438 | A1 * | 6/2003 | D'Ambro, Sr. | A23N 7/08 99/543 |
| 2007/0200018 | A1 * | 8/2007 | Leung | A47J 43/044 241/199.12 |
| 2007/0251399 | A1 * | 11/2007 | Van Heerden | B26D 3/11 99/596 |
| 2008/0307980 | A1 | 12/2008 | Lee et al. | |
| 2010/0224041 | A1 * | 9/2010 | Melton | B26D 1/09 83/13 |
| 2011/0030522 | A1 * | 2/2011 | Barnes | B26D 3/11 83/409 |
| 2011/0192290 | A1 | 8/2011 | Hauser et al. | |
| 2015/0158195 | A1 * | 6/2015 | Ferrari | B26D 1/143 83/100 |
| 2016/0046031 | A1 * | 2/2016 | Rogers | B26D 3/11 83/672 |
| 2016/0207152 | A1 * | 7/2016 | Weber | B23P 15/40 |
| 2016/0250768 | A1 * | 9/2016 | Levine | B26D 3/11 83/52 |
| 2016/0257013 | A1 * | 9/2016 | Exley | B26D 3/11 |
| 2017/0020339 | A1 * | 1/2017 | Allen | A47J 43/0722 |
| 2017/0112327 | A1 * | 4/2017 | Harris | A47J 43/044 |

* cited by examiner

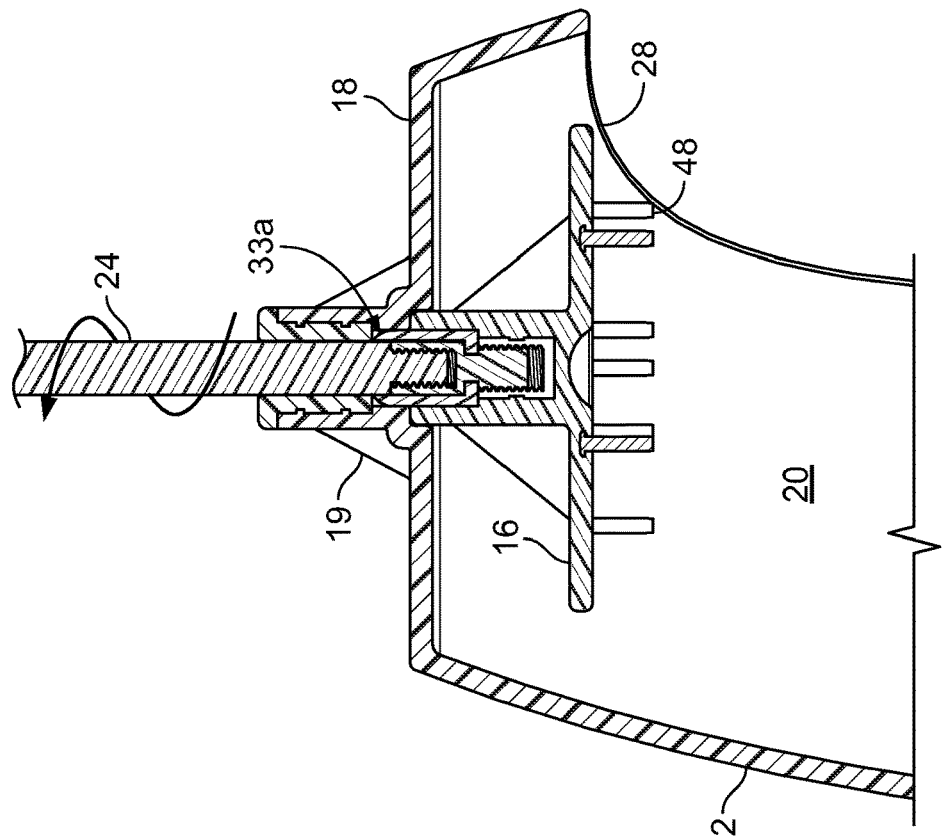
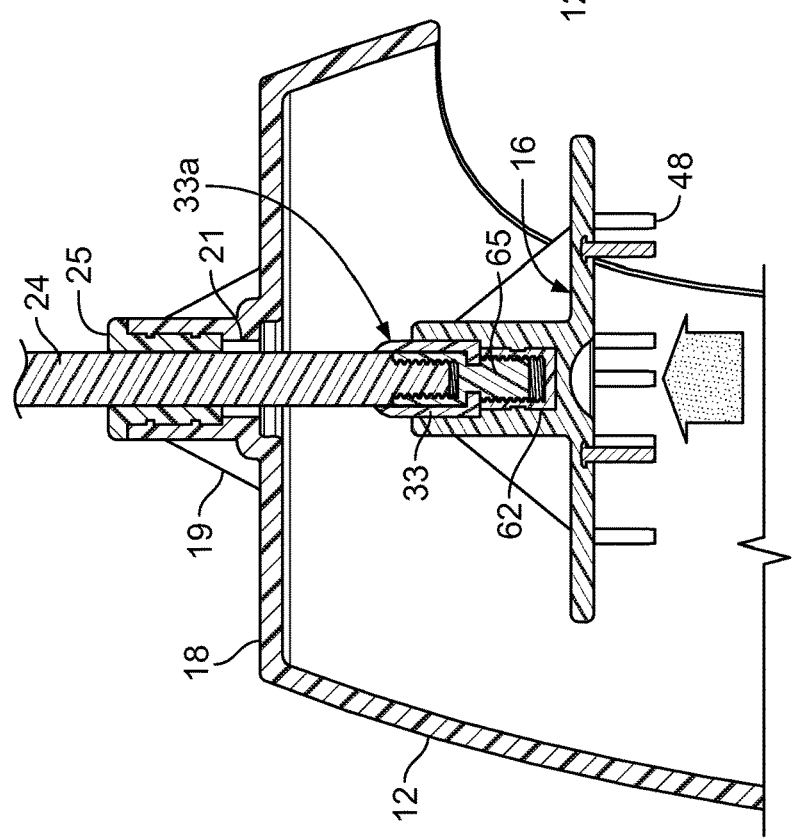

FOOD PROCESSING APPARATUS

CROSS-REFERENCE

This application claims the benefit of U.S. Provisional Application Ser. No. 62/232,137, filed on Sep. 24, 2015, and U.S. Provisional Application Ser. No. 62/280,500, filed on Jan. 19, 2016. The contents of these prior applications are incorporated herein by reference in their entirety.

BACKGROUND

This disclosure relates to an apparatus for processing foods, and more specifically to a tool used to create thin strips of foods in a spiral shape.

SUMMARY

The design disclosed herein provides a food processing apparatus having a compact design that improves performance and provides various user protection features. In general terms, a food item is placed on an operative surface inside the apparatus and rotatably held in place by a pin or similar structure adjacent two cutting blades. One blade is arranged generally perpendicular to the operative surface to cut the food item into strips. This first blade may include a plurality of blades, with the number of blades depending on the size of the strips desired. The other blade is arranged generally parallel to the first blade or blades and is used to slice the food item. The food item is engaged by a rotatable pusher at the top of the food item, and a handle is provided such that the user is able to rotate the food item against both the first blade and the second blade, thereby creating narrow spirals of food. These resulting spirals are then discharged through an opening in the operative surface. The pusher is easy to remove from the rotatable rod to which it is attached, enabling the user to clean the pusher without having to reach into the unit and possibly engaging the blades.

A better understanding of the invention will be obtained from the following detailed descriptions and accompanying drawings, which set forth illustrative embodiments that are indicative of the various ways in which the principals of the invention may be employed.

BRIEF DESCRIPTION OF THE DRAWINGS

FIGS. 12 and 13 are partial side views of a food processing apparatus in accordance with this disclosure, showing the manner in which certain components may be retained in a loading position without the user needing to hold such elements in place.

DETAILED DESCRIPTION

Figure 1:
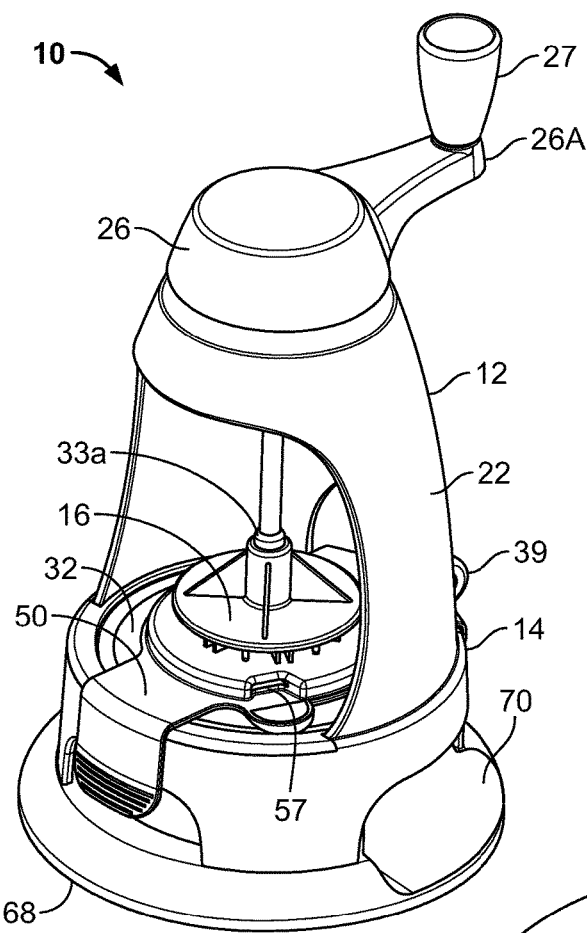
FIG. 1 is a top, front perspective view of an embodiment of a food processing apparatus in accordance with this disclosure.
Figure 2:
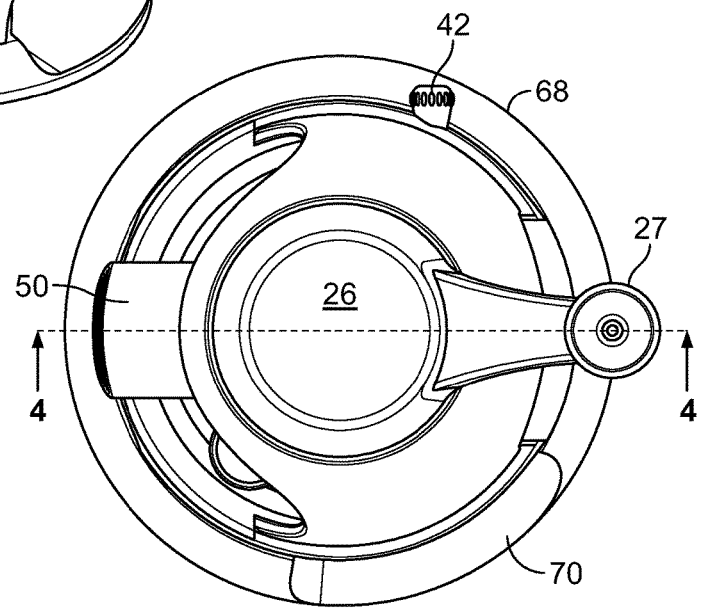
FIG. 2 is a top plan view of the food processing apparatus of FIG. 1.

The description that follows describes, illustrates and exemplifies one or more embodiments of the invention in accordance with its principles. This description is not provided to limit the invention of the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as aught herein and understood by one of ordinary skill in the art. It will be understood that the reference to elements as being generally flat or generally parallel or similar terms is intended to encompass minor variations therein that may be dictated by manufacturing tolerances or other concerns, and/or which are otherwise operable for their intended purposes.

Figure 14:
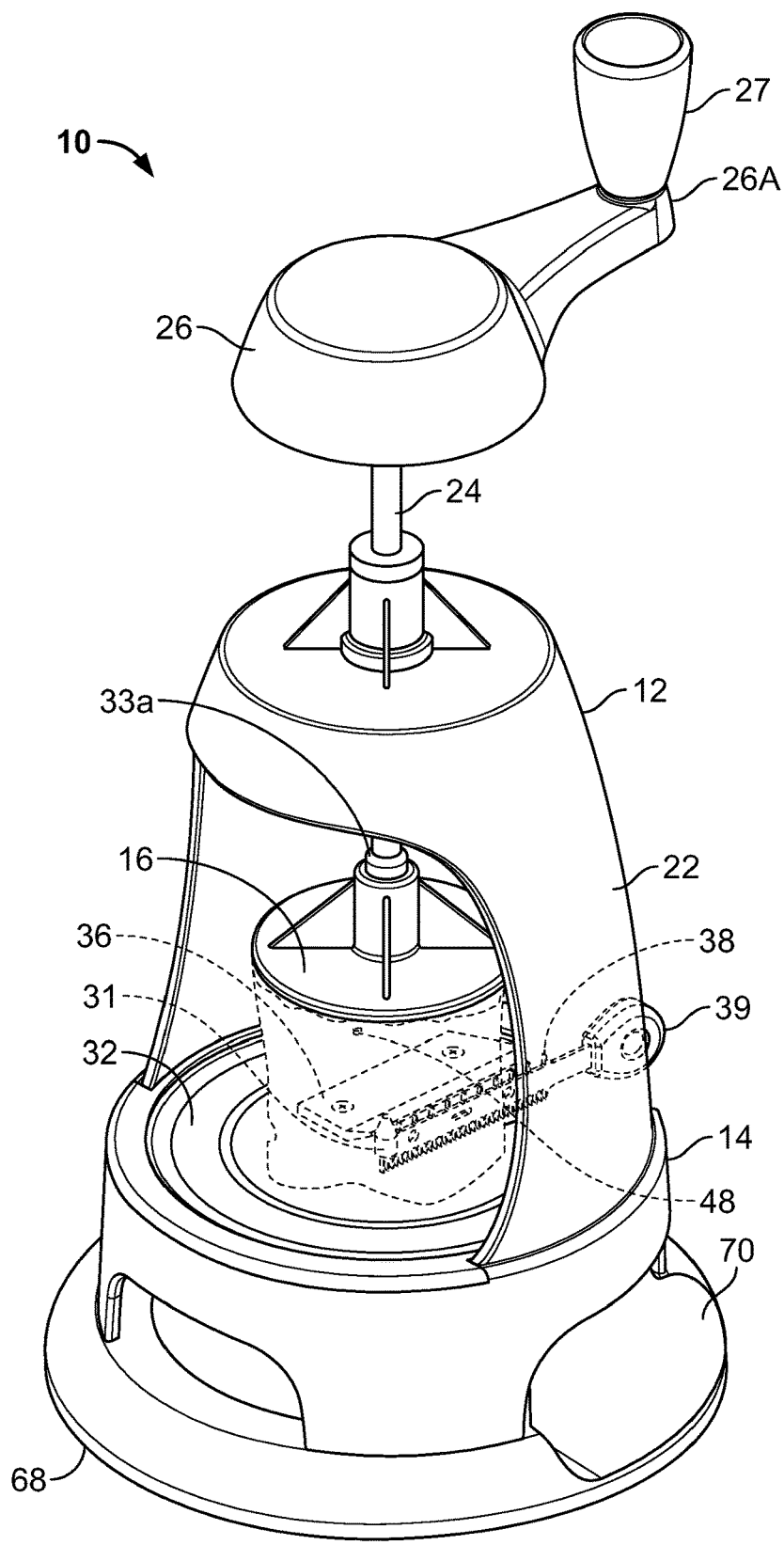
FIG. 14 is a perspective view of the food processing apparatus, similar to FIG. 1 but showing the unit in the operative position as it would be used with a food item.

As shown in, e.g., FIGS. 1-4, food processing apparatus 10 includes a base 68 intended to be placed on a flat workspace, such as a cutting board or counter top (not shown), for creating spiral cuts of a food item 60, shown in FIG. 14. Base 68 may be removable to improve the ability to fully clean the unit. Food processing apparatus 10 also comprises a main body 12 forming a holding chamber 20 disposed on top of a lower body 14. Main body 12 consists of a sidewall 22 extending upwardly from lower body 14 to terminate in a top surface 18. Sidewall 22 is integrally formed with a plurality of legs 41 extending downwardly from lower body 14, and these components are preferably composed of a hard plastic such as ABS.

Figure 3:
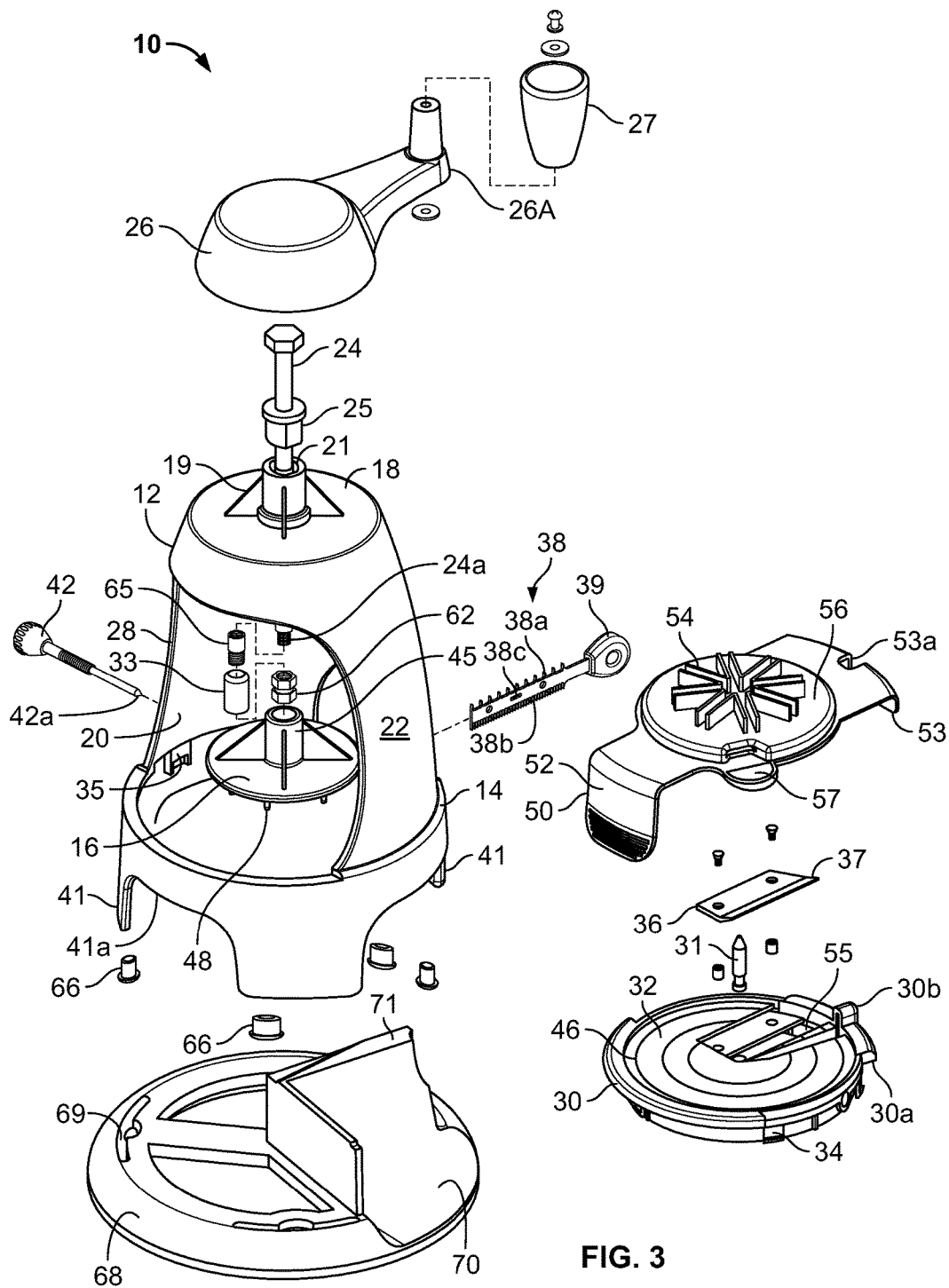
FIG. 3 is an exploded perspective view of the food processing apparatus as disclosed herein, and showing optional features and embodiments.

FIG. 3 is an exploded view that shows two different possible embodiments, namely one with base 68, shown as being removable, and one where base 68 is not used. Base 68 includes a plurality of slots 69, each adapted to receive one of legs 41 of main body 12. As noted above, it will be understood that base 68 is optional, and in case it is not desired to use the base 68, a plurality of feet 66 may be provided for mounting on the bottom of legs 41 to provide support on the appropriate working surface. Optional markings (not shown) may be placed on the base 68 adjacent one of the slots 69 and on one of the legs 41 to make it easier for the user to assemble the unit properly after it has been disassembled.

A plate 30 is attached to an upper portion of lower body 14 and forms a generally flat operative surface 32 that will be disposed in holding chamber 20 and parallel to the working surface. In the embodiment depicted, plate 30 is clipped to receiving structure 35 in lower body 14 by means of clips 34. Center pin 31 is secured to plate 30 to act as a spike or holding member to retain the food item 60 adjacent to the operative surface 32 in a rotatable manner. Slicing blade 36 is fastened to plate 30 and has a cutting surface 37 that is slightly offset from, and parallel to, the generally flat operative surface 32. Slicing blade 36 is located adjacent to the exit channel 55 formed in plate 30, whereby food that has been sliced exits through the exit channel 55 to the working surface. Base 68 also includes a discharge chute 70 to permit the spiral output of food processing apparatus 10 to be easily discharged from the operative surface 32 to the working surface (not shown) such as a cutting board or countertop.

A dual comb blade 38 is also mounted to food processing apparatus 10 in one of two positions. As can be seen in FIG. 3, dual comb blade 38 has a first, larger comb 38a on one side to cut food into wider strips, and a second narrower comb 38b on the other side to cut food into narrower strips. Both combs consist of a plurality of upright pins formed by wire cutting, and dual comb blade 38 may be installed so that one or the other of the combs 38a, 38b is exposed above operative surface 32.

Figure 6:
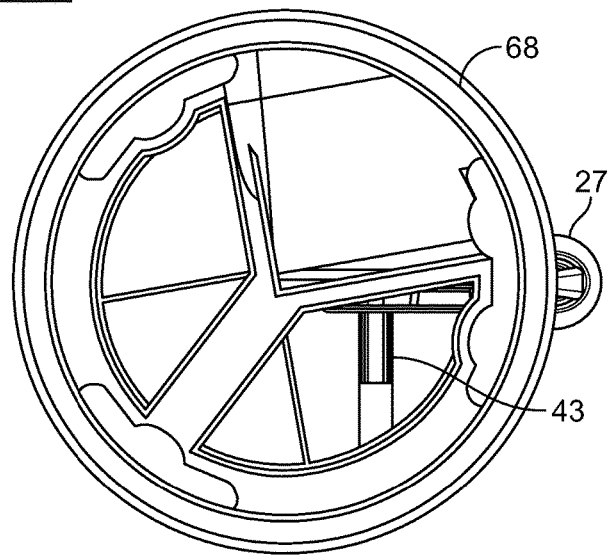
FIG. 6 is a bottom plan view of the food processing apparatus of FIG. 1.
Figure 7:
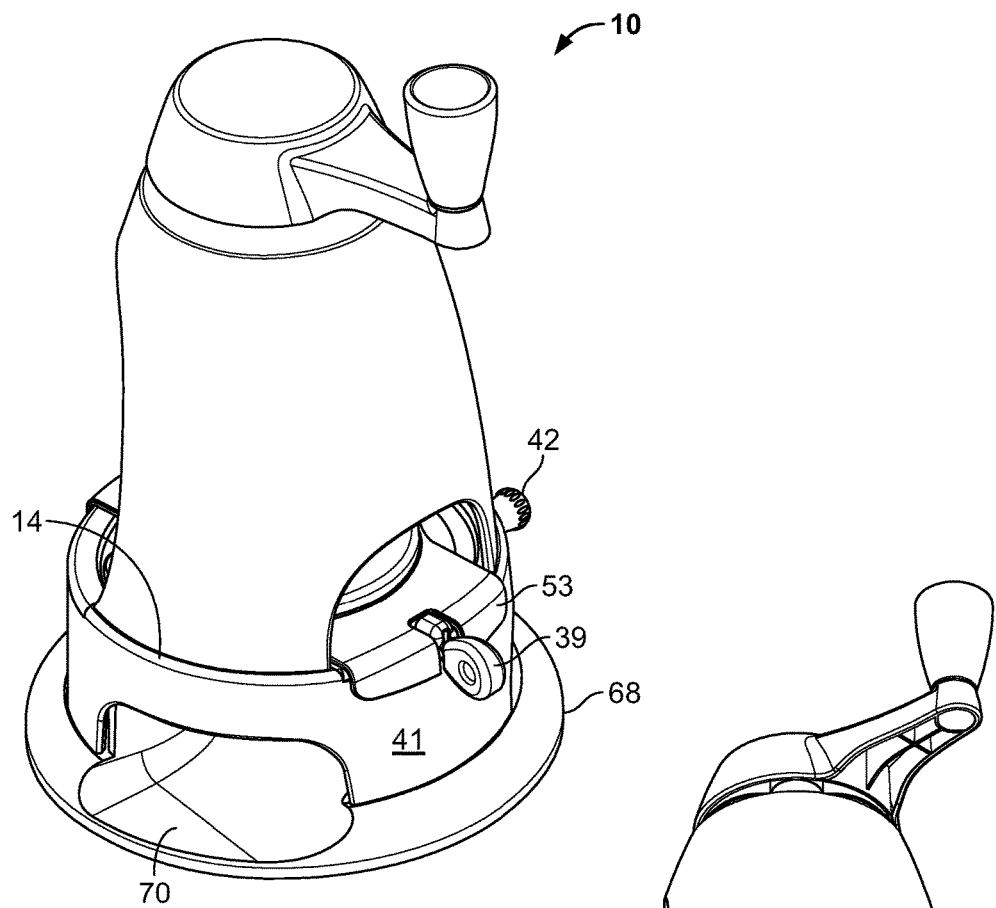
FIG. 7 is a top, rear perspective view of the food processing apparatus of FIG. 1.
Figure 8:
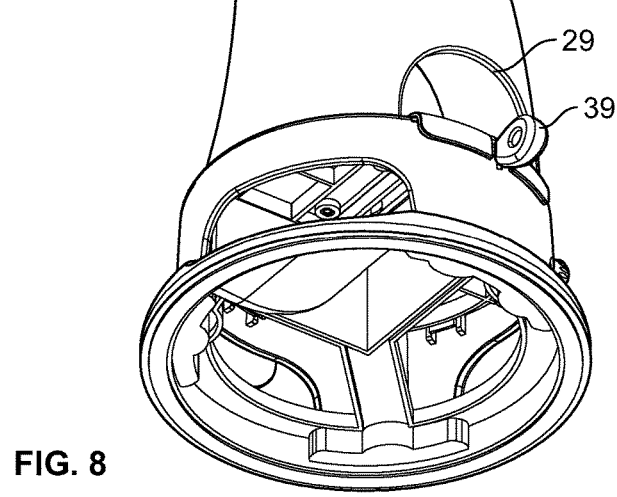
FIG. 8 is a bottom rear perspective view of the food processing apparatus of FIG. 1.

Dual comb blade 38 includes an insert molded grip 39 and is held in its operative position by means of a fixing screw 42 inserted into passage 43 as seen most clearly in FIG. 6. Conical tip 42a of fixing screw 42 will fit into center slot 38c of comb blade 38. The user should ensure that dual comb blade 38 is installed so that each cutting pin thereon is the same height from the operative surface 32; i.e., the tops thereof are not at an angle to operative surface 32, where they might contact pins 48 on pusher 16, as discussed below, resulting in damage to comb blade 38. As discussed in more detail below, a removable blade guard 50 is also provided. Dual comb blade 38 may be installed in its blade channel 44 when the blade guard 50 is in place, which helps o retain the dual comb blade 38 in the proper alignment and avoids an improper angle for dual comb blade 38. A rib (not shown) may be placed on the bottom of the main body 56 of blade guard 50, directly above comb blade 38, to assist in maintaining comb blade 38 in its proper alignment. Therefore, when dual comb blade 38 is installed in either configuration, the upright pins of combs 38a or 38b are generally perpendicular to operative surface 32. Thus, as shown, e.g., in FIG. 14, a food item 60 being processed will first be cut into strips by one side of dual comb blade 38, and then sliced thinly by slicing blade 36.

When not in use, dual comb blade 38 may be stored in a storage slot 57 formed in blade guard 50. It will be understood that only one comb is needed, and the dual comb arrangement shown is optional. It will also be understood that food processing apparatus 10 could be used without dual comb blade 38 to create a wider spiral output.

As seen most clearly in FIG. 3, boss 19 is disposed on top surface 18 and forms a rod opening 21, which extends entirely through top surface 18. Main body 12 has a first or front opening 28 through which the food item 60 may be placed) the holding chamber 20 for processing; this front opening 28 should be large enough to accommodate the usual food items that one would wish to spiral cut. A second or rear opening 29 is also provided to, e.g., assist in removing or attaching removable blade guard 50.

Pusher rod 24 extends through rod opening 21 and is supported by rod bushing 25. Rod 24 has a proximal end disposed inside the holding chamber 20 and a distal end disposed external to holding chamber 20. A pusher 16 is threaded on the proximal end of rod 24, and a crank 26 is fixed to the distal end of rod 24. Crank 26 further comprises a crank arm 26a to which a crank knob 27 may be attached. The size of the components of crank 26 will dependent on the size of the overall unit and the force required to process the food item 60. It will be understood that pusher rod 24 and the components attached thereto may be moved upward and downward, in a direction parallel to the central axis of pusher rod 24, without rotation, and the rotation of crank 26, rod 24 and pusher 16 is used for processing the food item 60 the blades as discussed herein.

Pusher 16 has a plurality of pins 48 extending downwardly a bottom surface to engage and hold the food item 60. Pins 48 are preferably stainless steel and molded into pusher 16. Pusher 16 also includes a boss 45 formed thereon which acts as a receptacle to receive, among other things, the proximal end of rod 24. A pusher threaded insert 62 is mounted in opening 59 of boss 45. As seen more clearly in FIGS. 12 and 13, a flexible sleeve 33, which in this embodiment consists a silicone sleeve, also fits into opening 59, and is held in place by tube anchor 65, which includes a set of internal threads to receive the threads 24a on the proximal end of rod 24 to secure pusher 16 to rod 24. Thus, a top portion 33a of flexible sleeve 33 extends above the top of opening 59 on boss 45.

As seen in FIGS. 12 and 13, when crank 26 is pulled up to the loading position, the top portion 33a of flexible sleeve 33 is received in the rod opening 21 in top 18. As crank 26 is turned slightly, the friction fit between flexible sleeve 33 and rod opening 21 holds the pusher rod 24 and pusher 16 in the loading position, without the user needing to maintain any upward pressure thereon, so that the user may use both hands to load the food item 60 into the holding chamber 20. Then, a small amount of downward pressure on crank 26 will release this friction fit, and enable the user to engage the food item 60 with pusher pins 48 and start the process.

As shown in FIG. 14, after food item 60 is held by both center pin 31 and pusher 16, the rotation of crank 26 will cause the food item 60 rotate against the dual comb blade 38 first, and then against cutting surface 37 of slicing blade 36, thereby creating narrow spirals of food which are discharged through exit channel 55. To prevent the spiraled food from collecting below lower body 14, discharge chute 70 may be provided to assist in discharging the food to the working surface such as a cutting board.

Additional safety features are provided by the present design. For example, blade guard 50 s used to protect the use from the slicing blade 36 when the food processing apparatus 10 is not in use and also assists in separating the pusher 16 from rod 24. Blade guard 50 is preferably composed of a stiff plastic such as ABS and consists of a main body 56, a front guard leg 52 at a front end thereof for gripping and holding the blade guard 50 and a rear guard leg 53 that engages plate 30. A pin engagement structure 54 is also formed on the top surface of the main body 56 of blade guard 50, and is shaped to receive the pins 48 on pusher 16, as will be described in more detail below.

Figure 4:
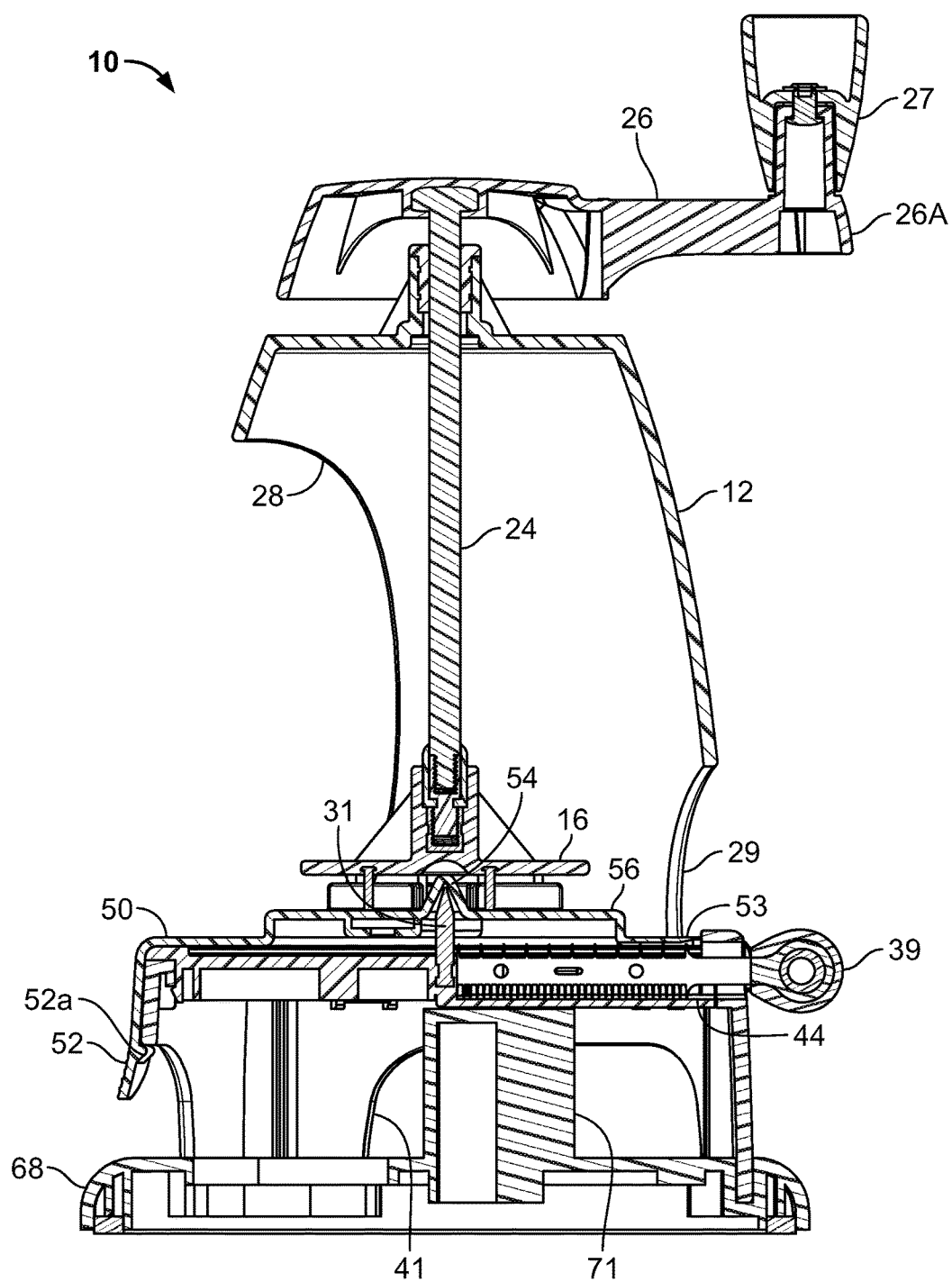
FIG. 4 is a cross-sectional, side elevational view of the food processing apparatus, along the lines 4-4 of FIG. 2.
Figure 5:
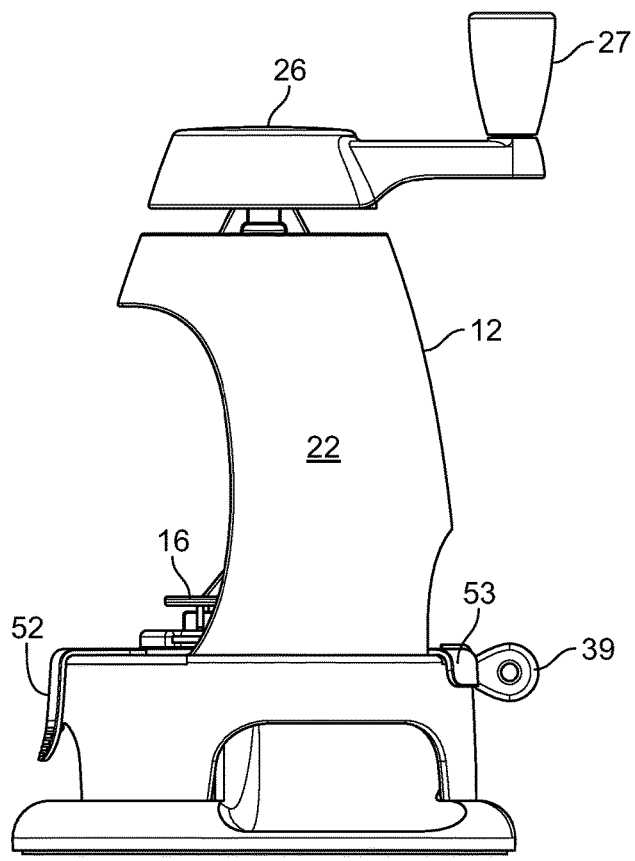
FIG. 5 is a side elevational view of the food processing apparatus as disclosed herein.

Blade guard 50 may be installed by inserting it through front opening 28 until rear guard leg 53 extends out the rear opening 29 and over catch 30a, which is formed as part of plate 30, and slot 53a lines up with notch 30b. A small rib or similar structure (not shown may be formed on the inner surface of second guard leg 53 to lock into a small slot formed between plate 30 and lower body 14. Front guard leg 52 then connects to lower body 14 by means of a similar rib 52*a* connecting to surface 41*a* between a pair of legs 41. Thus, when blade guard 50 is in place, cutting surface 37 of blade 36 is fully covered, as is comb blade 38 if installed in its operative position. As noted above, comb blade 38 may be removed from its storage slot 57 when blade guard 50 is in place, such as is shown in FIGS. 1 and 4, and then placed into its operative channel 44, before blade guard 50 is removed. The interaction of either comb blade 38*a* or 38*b* with an inner surface of rear guard leg 53 will help to ensure that the comb blade 38*a* or 38*b* is in the proper operative position i.e., not askew with respect to operative surface 32).

Figure 11:
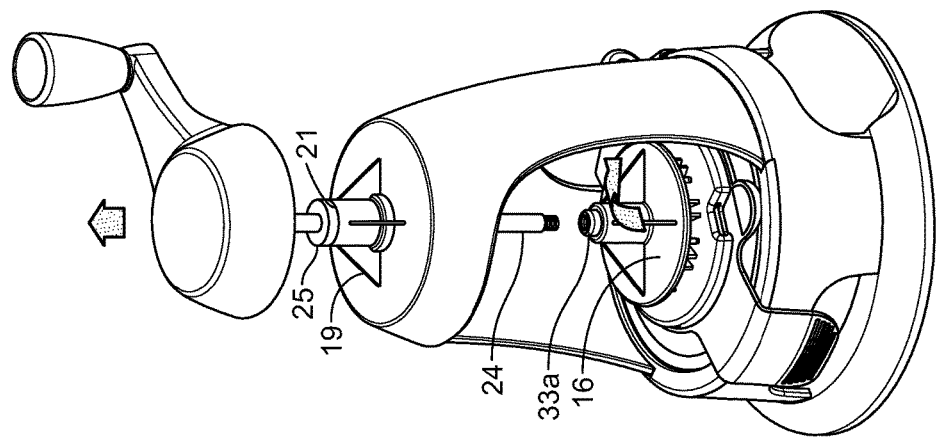
FIGS. 9, 10 and 11 are perspective views of a food processing apparatus in accordance with this disclosure and showing the manner in which certain elements may be disengaged from the apparatus.
Figure 10:
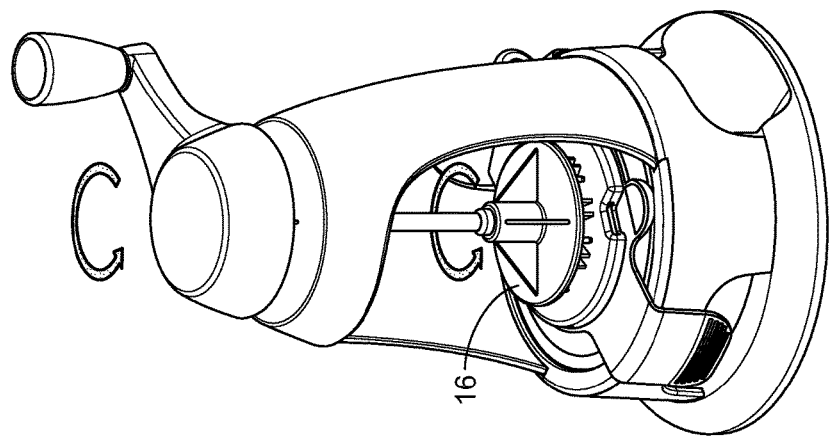
Figure 9:
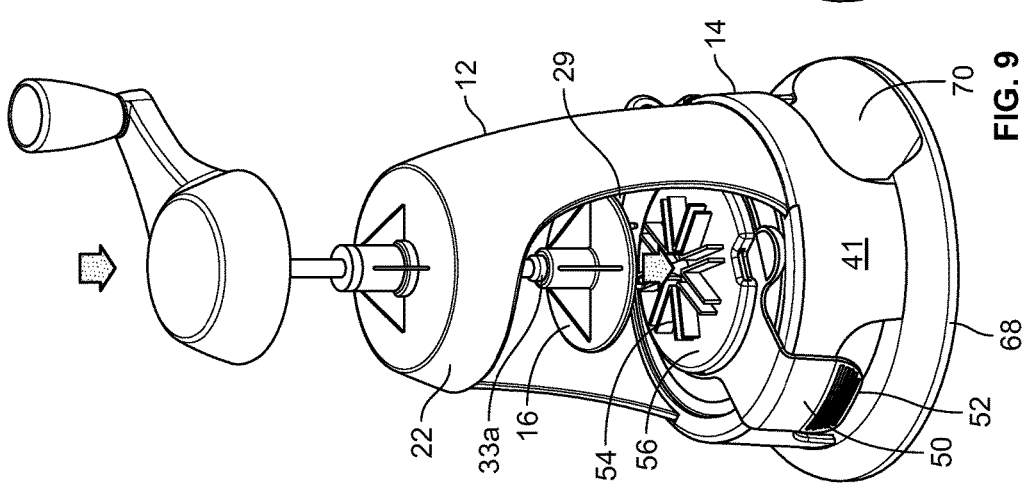

The use of blade guard 50 to assist in removal of pusher 16 can be seen most clearly in FIGS. 9 through 11, where there is no food item in holding chamber 20, and blade guard 50 has been installed, e.g., after food processing apparatus 10 has been used and is in need of cleaning. In FIG. 9, crank 26 and rod 24 are pushed downwardly, until pins 48 on pusher 16 engage the pin engagement structure 54 and thereby prevent further clockwise rotation of rod 24 and pusher 16, as shown in FIG. 10. Since pusher 16 is threaded onto rod 24 in a clockwise direction, a turn of the crank 26 in the counter-clockwise direction will unscrew the rod 24 from pusher 16 as rod 24 continues to rotate. Once the rod 24 and pusher 16 are disassembled, as shown in FIG. 11, the user may remove blade guard 50, with pusher 16 mounted thereon, from the assembly for cleaning without having to reach inside the housing where the blades are located, increasing the overall safety of the unit.

It will be understood that the rotating nature of food processing apparatus 10 requires that the food item 60 being sliced is centered on center pin 31. Operative surface 32 may optionally include one or more centering rings 46 to assist the user in ensuring that the food item 60 is properly centered. These centering rings 46 can be seen most clearly in FIG. 3.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. A food processing tool comprising:
a base configured to be placed on a work surface when using the food processing tool to process a food item;
an operative surface disposed on the base and configured to be above the work surface when the food processing tool is placed on the work surface;
a first blade disposed adjacent the operative surface and having a cutting element that extends generally parallel to the operative surface;
a second blade removably disposed in a receiving slot, the receiving slot being adjacent the work surface when the food processing tool is placed on the work surface, the second blade comprising a plurality of cutting points extending upwardly from a central spine, wherein the plurality of cutting points extend in a direction generally perpendicular to the cutting element of the first blade;
a main body comprising a sidewall extending upwardly from the operative surface of the base and terminating in a top surface to form a holding chamber;
a rotatable rod having a central axis, the rotatable rod center axis being generally perpendicular to the work surface when the food processing tool is placed on the work surface, the rotatable rod center axis extending through a rod opening formed in the top surface of the holding chamber, the rotatable rod having a proximal end disposed in the holding chamber and a distal end disposed outside the holding chamber;
a handle connected to the distal end of the rotatable rod for rotating the rotatable rod;
a pusher capable of being removably secured to the rotatable rod, the pusher comprising a plurality of pins extending from a lower surface thereof; and
a blade guard being attachable to the food processing tool when the food processing tool is not in an operating condition, the blade guard being removable from the food processing tool when the food processing tool is in an operating condition, the blade guard being removably attachable to the operative surface and comprising a bottom face to cover the first blade and the receiving slot, and a top face formed generally opposite to the bottom face, the blade guard further comprising a pin receiving structure on the top face, wherein the rotatable rod is capable of being moved along the direction of the central axis from at least one first position where the pusher is offset from the blade guard to a second position where the pusher is engaged to the pin receiving structure of the blade guard;
whereby the pin receiving structure is capable of engaging and holding the plurality of pins when the rotatable rod is in the second position, thereby preventing the pusher from rotating with the rotatable rod.

2. The food processing tool of claim 1, wherein the sidewall is integrally formed with the base.

3. The food processing tool of claim 1, wherein the main body further comprises a first front opening formed in the sidewall and a second rear opening formed in the sidewall, and the second rear opening is smaller than the first front opening.

4. The food processing tool of claim 3, wherein the blade guard further comprises a clip structure for extending through the second rear opening and capable of being engaged to an edge of the operative surface for holding the blade guard in place when the food processing tool is not in an operating condition.

5. The food processing tool of claim 4, wherein the blade guard further comprises a blade holding sleeve for retaining the second blade when the food processing tool is not in an operating condition.

6. The food processing tool of claim 1, further comprising a center pin extending upwardly from, and generally perpendicular to the operative surface, to retain the food item in place on the operative surface.

7. The food processing tool of claim 1, wherein the base and the operative surface form a channel to receive the second blade, and the blade guard is disposed over the channel when the blade guard is in place to assist in proper placement of the second blade.

8. The food processing tool of claim 7, wherein the second blade is a dual comb blade.

9. The food processing tool of claim 1, wherein the operative surface comprises a plate secured to a top of the base.

10. The food processing tool of claim 9, further comprising a center pin extending upwardly from, and generally perpendicular to the operative surface, to retain the food item in place on the operative surface, and the operative surface further comprises a plurality of circular rings formed thereon and concentric with the center pin for centering the food item.

11. The food processing tool of claim 1, wherein the base comprises a chute to assist in discharging the food item after it is processed to the work surface.

12. The food processing tool of claim 1, wherein the pusher further comprises a receptacle having receiving threads therein to engage a threaded portion of the proximal end of the rotatable rod to secure the rotatable rod to the pusher.

13. The food processing tool of claim 12, wherein the plurality of pins are stainless steel and are insert molded into the bottom face of the pusher.

14. A food processing tool comprising:
a base configured to be placed on a work surface when using the food processing tool to process a food item;
an operative surface disposed on the base and configured to be above the work surface when the food processing tool is placed on the work surface;
a first blade disposed adjacent the operative surface and having a cutting element that extends generally parallel to the operative surface;
a main body comprising:
a sidewall extending upwardly from the operative surface of the base and terminating in a top surface to form a holding chamber;
a rotatable rod having a central axis, the rotatable rod center axis being generally perpendicular to the work surface when the food processing tool is placed on the work surface, the rotatable rod center axis extending through a rod opening formed in the top surface of the holding chamber, the rotatable rod having a proximal end disposed in the holding chamber and a distal end disposed outside the holding chamber, and threads formed on the proximal end;
a handle connected to the distal end of the rotatable rod for rotating the rotatable rod;
a pusher capable of being removably secured to the rotatable rod, the pusher comprising a plurality pins extending from a lower surface thereof; and
a blade guard being attachable to the food processing tool when the food processing tool is not in an operating condition, the blade guard being removable from the food processing tool when the food processing tool is in an operating condition, the blade guard being removably attachable to the operative surface and comprising a bottom face to cover the first blade, and a top face formed generally opposite to the bottom face, the blade guard further comprising a pin receiving structure on the top face, wherein the rotatable rod is capable of being moved along the direction of the central axis from a first position where the pusher is offset from the blade guard to a second position where the pusher is engaged to the pin receiving structure of the blade guard;
whereby the pin receiving structure is capable of engaging and holding the plurality of pins when the rotatable rod is in the second position, thereby preventing the pusher from rotating with the rotatable rod.

15. The food processing tool of claim 14, wherein the main body further comprises a first front opening formed in the sidewall and a second rear opening formed in the sidewall, and the second rear opening is smaller than the first front opening.

16. The food processing tool of claim 15, wherein the sidewall is integrally formed with the base.

17. The food processing tool of claim 15, wherein the blade guard further comprises a clip structure for extending through the second rear opening and capable of being engaged to an edge of the operative surface for holding the blade guard in place.

18. The food processing tool of claim 17, further comprising a center pin extending upwardly from, and generally perpendicular to the operative surface, to retain the food item in place on the operative surface, wherein the operative surface comprises a plate secured to a top of the base and having a plurality of circular rings formed thereon and concentric with the center pin for centering the food item.

19. The food processing tool of claim 15, further comprising a second blade removably disposed in a receiving slot adjacent the work surface, the second blade comprising a plurality of cutting points extending upwardly from a central spine, wherein the plurality of cutting points extend in a direction generally perpendicular to the cutting element of the first blade.

20. The food processing tool of claim 19, wherein the base comprises a chute to assist in discharging the food item after it is processed to the work surface.

21. A food processing tool comprising:
a base configured to be placed on a work surface when using the food processing tool to process a food item;
an operative surface disposed on the base and configured to be above the work surface when the food processing tool is placed on the work surface;
a first blade disposed adjacent the operative surface and having a cutting element that extends generally parallel to the operative surface;
a second blade removably disposed adjacent the work surface when the food processing tool is placed on the work surface, the second blade comprising a plurality of cutting points extending upwardly in a direction generally perpendicular to the cutting element of the first blade;
a main body comprising a sidewall extending upwardly from the operative surface of the base and terminating in a top surface to form a holding chamber;
a rotatable rod having a central axis, the rotatable rod center axis being generally perpendicular to the work surface when the food processing tool is placed on the work surface, the rotatable rod center axis extending through a rod opening formed in the top surface of the holding chamber, the rotatable rod having a proximal end disposed in the holding chamber and a distal end disposed outside the holding chamber;
a handle connected to the distal end of the rotatable rod for rotating the rotatable rod;
a pusher connected to the rotatable rod and comprising a plurality of pins extending from a lower surface thereof; and
a blade guard being attachable to the food processing tool when the food processing tool is not in an operating condition, the blade guard being removable from the food processing tool when the food processing tool is in an operating condition, the blade guard being removably attachable to the operative surface and comprising a bottom face and a top face formed generally opposite to the bottom face, the blade guard further comprising a pin receiving structure on the top face, wherein the rotatable rod is capable of being moved along the direction of the central axis from at least one first position where the pusher is offset from the protective cover to a second position where the pusher is engaged to the pin receiving structure of the blade guard, whereby the pin receiving structure is capable of engaging and holding the plurality of pins when the rotatable rod is in the second position, thereby preventing the pusher from rotating with the rotatable rod.

* * * * *